F. A. KENNEY.
VEHICLE LOADING AND UNLOADING MEANS.
APPLICATION FILED APR. 28, 1911.

1,027,612.

Patented May 28, 1912.

2 SHEETS—SHEET 1.

WITNESSES:

INVENTOR

Frederick A. Kenney.

BY

O. O. Martin.

ATTORNEY

F. A. KENNEY.
VEHICLE LOADING AND UNLOADING MEANS.
APPLICATION FILED APR. 28, 1911.
1,027,612.
Patented May 28, 1912.
2 SHEETS—SHEET 2.
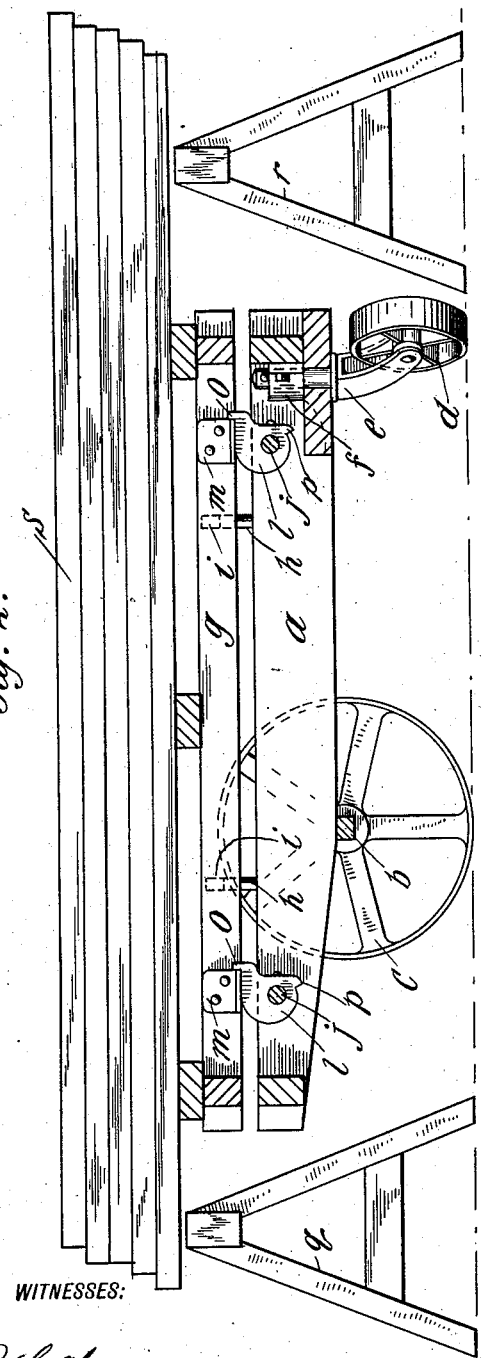
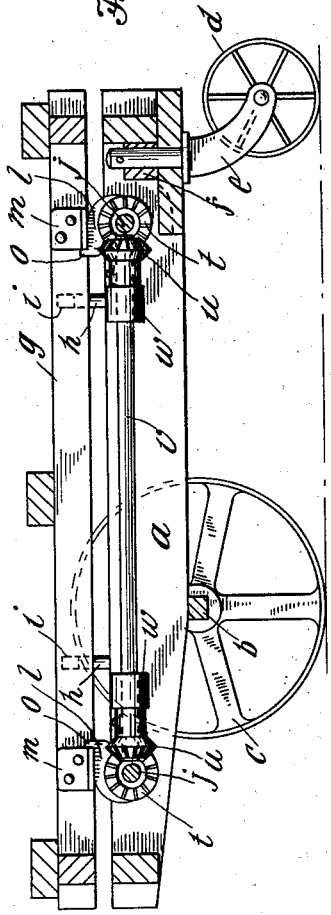
WITNESSES:
INVENTOR
Frederick A. Kenney
BY
O. O. Martin.
ATTORNEY

UNITED STATES PATENT OFFICE.

FREDERICK A. KENNEY, OF PORTLAND, OREGON.

VEHICLE LOADING AND UNLOADING MEANS.

1,027,612.   Specification of Letters Patent.   Patented May 28, 1912.

Application filed April 28, 1911. Serial No. 623,941.

*To all whom it may concern:*

Be it known that I, FREDERICK A. KENNEY, a citizen of the United States, residing at Portland, in the county of Multnomah and State of Oregon, have invented certain new and useful Improvements in Vehicle Loading and Unloading Means, of which the following is a specification.

My invention relates to a vehicle for carrying lumber, and has more particular reference to a floor truck such as used in lumber, saw and planing mills.

To this end my object is to provide my floor truck with means for quickly loading and unloading lumber carried from place to place within the mill, in order that one truck may suffice, where at present a number of trucks have to be employed on account of the time consumed in loading and unloading.

The objects and features of my invention are better understood by having reference to the following description.

Figure 1:
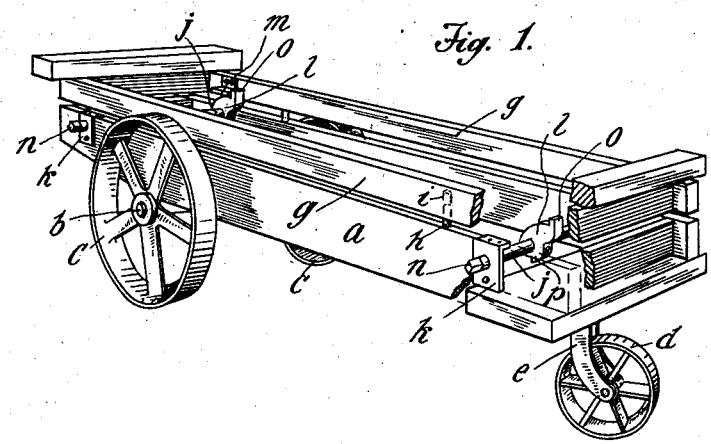
Figure 3:
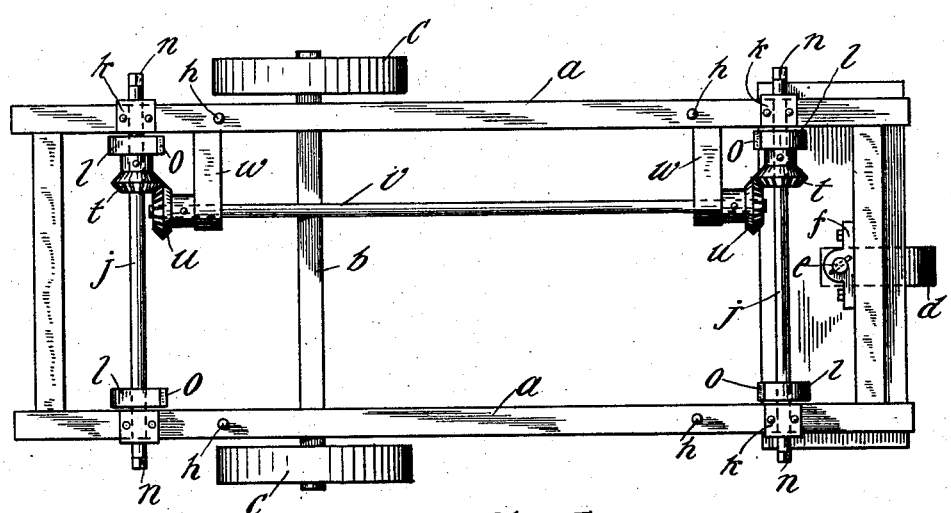

In the drawings:—Figure 1 is a perspective side elevation of a floor truck embodying my invention. Fig. 2 is a sectional side elevation showing the elevating frame of my truck raised on the truck body and carrying a load of lumber, Fig. 3 is a plan view of my truck illustrating a modified form of unloading mechanism and Fig. 4 shows, in sectional side elevation, parts of Fig. 3.

The truck proper may be of any suitable construction, but I prefer to show my invention as applied to the 3 wheeled truck illustrated throughout the drawings, this being the most convenient type of vehicle for the purpose I have primarily in mind. To truck body $a$ is secured a shaft $b$, on which the rear wheels $c$ are rotatably hung. Front wheel $d$ is, to facilitate the steering of my truck, journaled in a bifurcated frame $e$, which is free to swing in its bearing $f$, mounted on the truck body. A frame $g$ is placed on the truck body and held against horizontal displacement relative to said body by a series of dowels $h$ of the body engaging a corresponding series of sockets $i$ of the frame.

Frame $g$, as readily seen by referring to the drawings, is free to be raised and lowered on the truck body, for purposes explained later, and the mechanism for thus moving said frame comprises a series of transverse shafts $j$, journaled in the truck body in suitable bearings $k$. Rigid on each of said shafts, and in close proximity to the side frames of the truck body are a pair of cam-levers $l$ registering with a series of angle plates $m$ of frame $g$. Shafts $j$ are made with squared ends $n$, adapted to receive a suitable handle or wrench, by means of which the shafts are rotated to raise or lower frame $g$. Cam levers $l$ are made with projections $o$, $p$, which, when the shafts are rotated, engage the edges of angle plates $m$, thus limiting the motion of the cam levers.

The method of operating my truck is best illustrated in Fig. 2, where $q$, $r$ represent horses or similar stands for supporting the load of lumber, $s$, to be transported. The truck is first positioned directly underneath the lumber. Frame $g$ is then elevated, as already described, picking up the load of lumber and raising it clear of the supports $q$, $r$. The truck is then wheeled to its place of destination, positioned between a pair of supports, similar to those shown, and frame $g$ again lowered, causing the load to settle on the supports and releasing the truck, which is wheeled away ready to take the next load of lumber.

In Figs. 3, 4 I show, in addition to the construction described above, means for operatively connecting the cam shafts of the truck, whereby I am able to raise or lower frame $g$ in one operation, thus still further reducing the time required in loading and unloading. On cam shafts $j$ I rigidly mount bevel gear wheels $t$, which are in mesh with bevel gear wheels $u$ of connecting shaft $v$, and the latter journals in suitable bearings $w$ of the truck body.

While I have described my unloading device in connection with a floor truck, it is obvious that it adapts itself readily to any type of vehicle.

On large vehicles I may prefer to increase the number of camshafts, without thereby departing from the principle of my invention. By adapting all of the ends of the camshafts to receive the operating handle, I greatly facilitate the operation of my device, and when in addition the camshafts are operatively connected, it is readily seen that the mechanism, even when the truck is confined within obstructions, is easily manipulated.

I claim:

In a device of the character described in combination: a vehicle, a frame mounted on said vehicle, a series of dowel pins of said vehicle engaging said frame thereby retaining the frame in vertical alinement on the vehicle, a series of transverse camshafts journaled in said vehicle and provided at their ends with means for attaching an operating handle, a pair ofe ccentric cams rigid on each of said camshafts, a series of projections on the frame registering with said eccentric cams, a pair of lugs on each cam adapted to engage the edges of said frame projections to limit the motion of the cams, all substantially as set forth.

In testimony whereof I affix my signature in presence of two witnesses.

FREDERICK A. KENNEY.

Witnesses:
KATE F. DOUGHTY,
B. H. HUSON.

Copies of this patent may be obtained for five cents each, by addressing the "Commissioner of Patents, Washington, D. C."